United States Patent
Na

[11] Patent Number: 6,005,961
[45] Date of Patent: Dec. 21, 1999

[54] METHOD FOR PROCESSING NAME WHEN COMBINING NUMERICAL MAP SHAPE DATA

[75] Inventor: Seong-Wuk Na, Seoul, Rep. of Korea

[73] Assignee: Samsung Electronics Co., Ltd., Kyungki-Do, Rep. of Korea

[21] Appl. No.: 08/864,543

[22] Filed: May 28, 1997

[30] Foreign Application Priority Data

Nov. 4, 1996 [KR] Rep. of Korea ............ 96/51904

[51] Int. Cl.⁶ ........................................... G06K 9/00
[52] U.S. Cl. .................... 382/113; 382/109; 382/218; 382/284
[58] Field of Search ........................... 382/108, 109, 382/202, 218, 284, 113, 124, 171

[56] References Cited

U.S. PATENT DOCUMENTS

4,984,279  1/1991  Kidney ............................. 382/113
5,717,777  2/1998  Wong et al. ...................... 382/124
5,719,949  2/1998  Koeln et al. ..................... 382/113

*Primary Examiner*—Matthew C. Bella
*Attorney, Agent, or Firm*—Sughrue, Mion, Zinn, Macpeak & Seas, PLLC

[57] ABSTRACT

A method for processing a name when converting a numerical map of a low level into a numerical map of a high level in a geographic information system includes the steps of: sequentially determining a main name which is a criterion of comparison and a sub name which is an object of comparison according to priority with respect to names contained in the numerical map of the low level, and generating a main name box and a sub name box according to a position and an area in which the main name and the sub name are displayed on the numerical map of the high level; and checking whether a part or all parts of the sub name box is overlapped with the main name box, and erasing a corresponding name and a name designating coordinate point when there is an overlapped part.

3 Claims, 6 Drawing Sheets

METHOD FOR PROCESSING NAME WHEN COMBINING NUMERICAL MAP SHAPE DATA

BACKGROUND OF THE INVENTION

1. Field of the Invention

The present invention relates to a method for processing a name of numerical map shape data in a geographic information system (GIS) and, more particularly, to a method for processing a name of shape data when converting a numerical map of a specific level to a numerical map of a multiple level.

2. Description of the Related Art

Typically, a geographic information system is used in a navigation system of a mobile object. The navigation system of the mobile objects such as ships, airplanes, automobiles, etc. has a position determination unit used in a global positioning system (GPS), and confirms the current position and moving speed of the mobile object or determines a moving path. The GPS position determination unit receives a radio wave indicating latitude, longitude and altitude from 3 or more artificial satellites belonging to the GPS positioned in 6 middle orbits, and calculates the current position of the mobile object. Map information including this current position is displayed so that a driver may see it. A typical navigation system reads the map information from an auxiliary storage device, for example, a CD-ROM, and displays the current position of the mobile object calculated from navigation information received from the satellites. To this, various numerical maps should be displayed. In order to efficiently manage the data, the numerical maps drawn on a small reduced scale are combined to obtain a numerical map drawn on a large reduced scale.

However, when making the numerical map drawn on the large reduced scale by using the numerical map drawn on the small reduced scale, there are no standards for processing road and terrain data. Moreover, there is large loss of material resources and manpower since such a process for making the numerical map depends on manual labor. In addition, if the numerical map is simply combined, the name is repeatedly indicated.

SUMMARY OF THE INVENTION

It is an object of the present invention to provide a method for automatically arranging a name of shape data according to a corresponding level without the name being repeated when converting a numerical map of a specific level to a numerical map of a multiple level.

In accordance with one aspect of the present invention, a method for processing a name when converting a numerical map of a low level into the numerical map of a high level in a geographic information system includes the steps of: sequentially determining a main name which is a criterion of comparison and a sub name which is an object of comparison according to priority with respect to names contained in the numerical map of the low level, and generating a main name box and a sub name box according to a position and an area in which the main name and the sub name are displayed on the numerical map of the high level; and checking whether a part or all parts of the sub name box is overlapped with the main name box, and erasing a corresponding name and a name designating coordinate point when there is an overlapped part.

The present invention will be more specifically described with reference to the attached drawings in which like reference numerals and symbols designate like or corresponding parts throughout several views. In the following description, numerous specific details are set forth to provide a more thorough understanding of the present invention. It will be apparent, however, to one skilled in the art that the present invention may be practiced without these specific details. In other instances, well known features or constructions have not been described so as not to obscure the present invention.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT(S)

Figure 1:
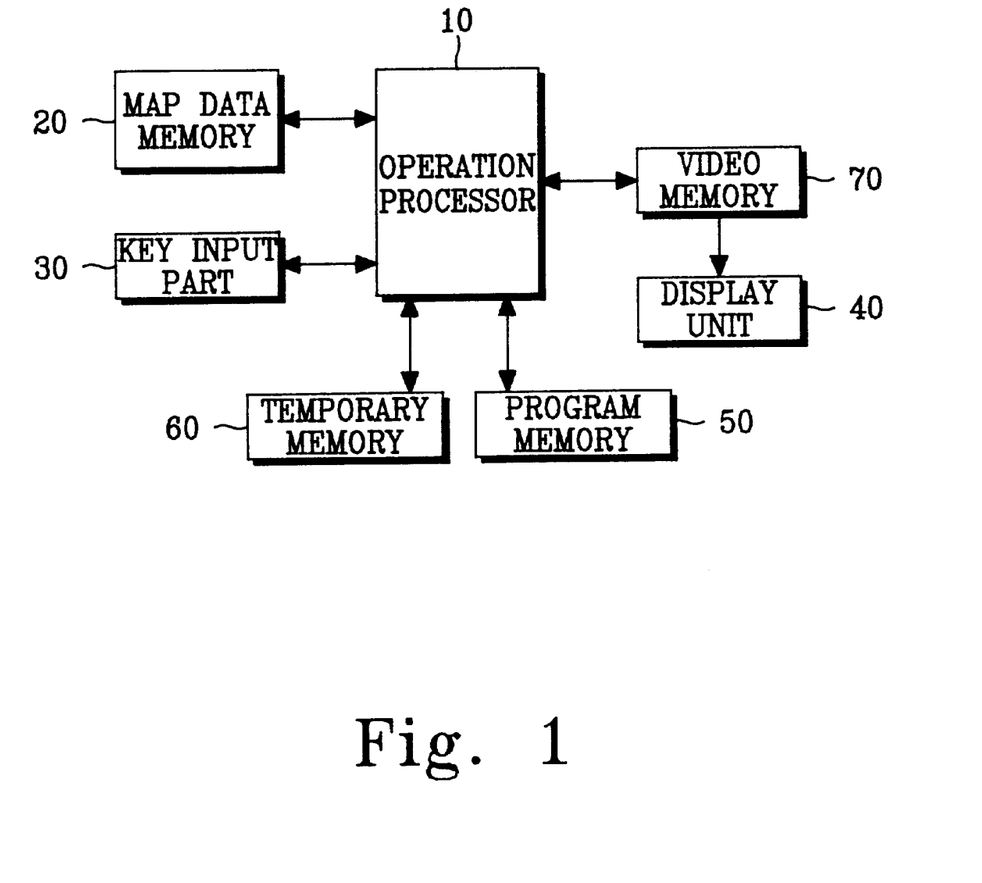
FIG. 1 is a block diagram of a geographic information system applied to the present invention.

Referring to FIG. 1, an operation processor 10 processes an operation for converting numerical map shape data and processing its name. A map data memory 20 stores a numerical map. A key input part 30 is for user interface such as the input of various commands and data for converting the numerical map shape data and processing its name. A display unit 40 displays the numerical map and a result of processing the data related thereto on a screen. A temporary memory 60 temporarily stores data generated when converting the numerical map shape data and processing its name. A program memory 50 stores a control program for converting the numerical map shape data and processing its name. The program memory 50 is accessed by the operation processor 10. A video memory 70 converts data supplied from the operation processor 10 so as to be displayed on the screen in the display unit 40.

Figure 2:
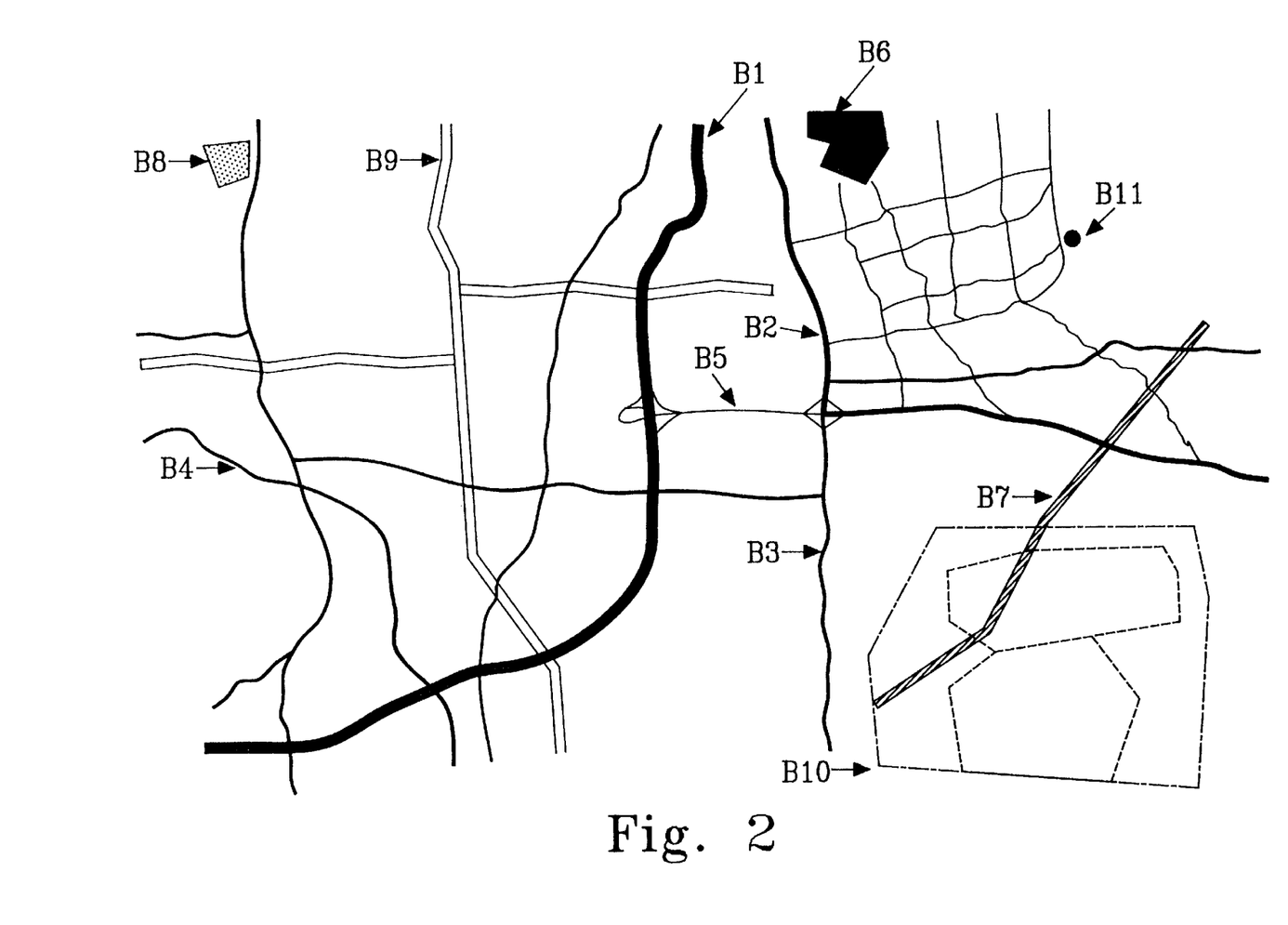
FIG. 2 illustrates an example of an existing road and terrain.

FIG. 2 illustrates an example of an existing road and terrain. Reference symbols B1–B5 designate roads, B1, B2, B3, B4 and B5 indicating an expressway, a state road, a local road, other roads and a connection road, respectively. The connection road B5 is for connecting the roads B1–B2. Reference symbols B6–B11 designate terrain, B6, B7, B11, B8, B9 and B10 designating polygon terrain, line terrain, point terrain, a polygon water system, a line water system and an administrative district, respectively.

The following Table 1 shows the reduced scale, size, number and data form of each level. The reduced scale of a level 7 is one to 2,400,000 including all parts of Korea and has a form of image data. The reduced scale of a level 6 having a form of numerical vector data is one to 1,200,000 of the size dividing the reduced scale of the level 7 by 4 and has 4 in number. The reduced scale of a level 5 having a form of the numerical vector data is one to 200,000 of the size dividing the reduced scale of the level 6 by 6 and has 24 in number. The next levels can be analyzed like the above relationship. However, the numerical vector data of each level from the level 1 to the level 5 does not always exist. A region in which the data does not exist is also contained in number.

TABLE 1

| level | reduced scale | size | number | note |
|---|---|---|---|---|
| 7 | 1:2,400,000 | latitude: 33°–39° (6°) longitude: 125°35"–129°35" (4°) | 1 | image data |
| 6 | 1:1,200,000 | latitude: 3° (≈ 336,000 meter) longitude: 2° (≈ 176,000 meter) | 4 per level 7 | numerical vector data |
| 5 | 1:200,000 | latitude: 1° (≈ 112,000 meter) longitude: 1° (≈ 88,000 meter) | 6 per level 6 | numerical vector data |
| 4 | 1:100,000 | latitude: 30' (≈ 56,000 meter) longitude: 30' (≈ 44,000 meter) | 4 per level 5 | numberical vector data |
| 3 | 1:50,000 | latitude: 15' (≈ 28,000 meter) longitude: 15' (≈ 22,000 meter) | 4 per level 4 | numerical vector data |
| 2 | 1:25,000 | latitude: 7' 30" (≈ 14,000 meter) longitude: 7' 30" (≈ 11,000 meter) | 4 per level 3 | numerical vector data |
| 1 | 1:5,000 | latitude: 1' 30" (≈ 28,000 meter) longitude: 1' 30" (≈ 2,200 meter) | 25 per level 2 | numerical vector data |

The numerical map of any one level consists of various shape data having formats shown in Table 2 to Table 9.

The following Table 2 indicates the format of a header of the shape data. A parameter N1 designates the total number of roads including 1,. . . ,N1. In Table 2, the total number of roads is indicated as 2 bytes and its range is up to 65535 from 0 in decimal notation. A map number has a form of ASCII code. A character of the first place of the map number indicates the level 6 in the level 7 and has a value of 1 to 4. The character of the second place indicates the level 5 in the level 6 and has a value of 1 to 6. The character of the third place indicates the level 4 in the level 5 and has a value of 1 to 4. The character of the fourth place indicates the level 3 in the level 4 and has a value of 1 to 4. The character of the fifth place shows the level 2 in the level 3 and has a value of 1 to 4. The characters of the sixth and seventh places indicate the level 1 in the level 2 and have a value of 1 to 25.

TABLE 2

| | item | | length of data | form | range |
|---|---|---|---|---|---|
| header of shape data | map number | | 7 | ASCII character | 1100000–4644425 |
| | resolution of display unit | X direction | 2 | binary | 0–65535 |
| | | Y direction | 2 | binary | 0–65535 |
| | total number (N1) of roads | | 2 | binary | |
| | total number (N2) of polygon terrain | | 2 | binary | |
| | total number (N3) of line terrain | | 2 | binary | |
| | total number (N4) of point terrain | | 2 | binary | |
| | total number (N5) of polygon water systems | | 2 | binary | |
| | total number (N6) of line water systems | | 2 | binary | |
| | total number (N7) of administrative districts | | 2 | binary | |

The following Table 3 shows the format of road data. Since the total number of roads is up to N1, the map data memory 20 has road data 1,. . . , N1 having the format shown in Table 3.

TABLE 3

| | item | | | data length | form | range |
|---|---|---|---|---|---|---|
| road data | kind of road | | | 2 | binary | 011–500 |
| | total number (M) of shape coordinates | | | 2 | binary | 1–65536 |
| | shape coordinate group | shape coordinate point (1) | X coordinate | 4 | binary | 0–4294967295 (meter) |
| | | | Y coordinate | 4 | binary | |
| | | . . . | | | | |
| | | shape coordinate point (M) | X coordinate | 4 | binary | 0–4294967295 (meter) |
| | | | Y coordinate | 4 | binary | |

TABLE 3-continued

| | item | | data length | form | range |
|---|---|---|---|---|---|
| name data | number of characters of name | | 1 | binary | 0–15 |
| | name | | 30 | Korean industrial standard | |
| | name designating coordinate point | X coordinate | 4 | binary | 0–4294967295 (meter) |
| | | Y coordinate | 4 | binary | |

The following Table 4 shows the format of polygon terrain data.

TABLE 4

| | item | | data length | form | range |
|---|---|---|---|---|---|
| polygon terrain data | kind of polygon terrain | | 2 | binary | 100–6000 |
| | total number (M) of shape coordinates | | 2 | binary | 1–65536 |
| | shape coordinate group | shape coordinate point (1) | X coordinate | 4 | binary | 0–4294967295 (meter) |
| | | | Y coordinate | 4 | binary | |
| | | . . . | | | | |
| | | shape coordinate point (M) | X coordinate | 4 | binary | 0–4294967295 (meter) |
| | | | Y coordinate | 4 | binary | |
| | name data | number of characters of name | 1 | binary | 0–15 |
| | | name | 30 | Korean industrial standard | |
| | | name designating coordinate point | X coordinate | 4 | binary | 0–4294967295 (meter) |
| | | | Y coordinate | 4 | binary | |

The following Table 5 shows the format of line terrain data.

TABLE 5

| | item | | data length | form | range |
|---|---|---|---|---|---|
| line terrain data | kind of line terrain | | 2 | binary | 100–6000 |
| | total number (M) of shape coordinates | | 2 | binary | 1–65536 |
| | shape coordinate group | shape coordinate point (1) | X coordinate | 4 | binary | 0–4294967295 (meter) |
| | | | Y coordinate | 4 | binary | |
| | | . . . | | | | |
| | | shape coordinate point (M) | X coordinate | 4 | binary | 0–4294967295 (meter) |
| | | | Y coordinate | 4 | binary | |
| | name data | number of characters of name | 1 | binary | 0–15 |
| | | name | 30 | Korean industrial standard | |
| | | name designating coordinate point | X coordinate | 4 | binary | 0–4294967295 (meter) |
| | | | Y coordinate | 4 | binary | |

The following Table 6 shows the format of point terrain data.

TABLE 6

| | item | | | data length | form | range |
|---|---|---|---|---|---|---|
| point terrain data | kind of point terrain | | | 2 | binary | 100–6000 |
| | total number (M) of shape coordinates | | | 2 | binary | 1–65536 |
| | shape coordinate group | shape coordinate point (1) | X coordinate | 4 | binary | 0–4294967295 (meter) |
| | | | Y coordinate | 4 | binary | |
| | | . . . | | | | |
| | | shape coordinate point (M) | X coordinate | 4 | binary | 0–4294967295 (meter) |
| | | | Y coordinate | 4 | binary | |
| | name data | number of characters of name | | 1 | binary | 0–15 |
| | | name | | 30 | Korean industrial standard | |
| | | name designating coordinate point | X coordinate | 4 | binary | 0–4294967295 (meter) |
| | | | Y coordinate | 4 | binary | |

The following Table 7 shows the format of polygon water system data.

TABLE 7

| | item | | | data length | form | range |
|---|---|---|---|---|---|---|
| polygon water system data | total number (M) of shape coordinates | | | 2 | binary | 1–65536 |
| | shape coordinate group | shape coordinate point (1) | X coordinate | 4 | binary | 0–4294967295 (meter) |
| | | | Y coordinate | 4 | binary | |
| | | . . . | | | | |
| | | shape coordinate point (M) | X coordinate | 4 | binary | 0–4294967295 (meter) |
| | | | Y coordinate | 4 | binary | |
| | name data | number of characters of name | | 1 | binary | 0–15 |
| | | name | | 30 | Korean industrial standard | |
| | | name designating coordinate point | X coordinate | 4 | binary | 0–4294967295 (meter) |
| | | | Y coordinate | 4 | binary | |

The following Table 8 shows the format of line water system data.

TABLE 8

| | item | | | data length | form | range |
|---|---|---|---|---|---|---|
| line water system data | total number (M) of shape coordinates | | | 2 | binary | 1–65536 |
| | shape coordinate group | shape coordinate point (1) | X coordinate | 4 | binary | 0–4294967295 (meter) |
| | | | Y coordinate | 4 | binary | |
| | | . . . | | | | |
| | | shape coordinate point (M) | X coordinate | 4 | binary | 0–4294967295 (meter) |
| | | | Y coordinate | 4 | binary | |

TABLE 8-continued

| item | | data length | form | range |
|---|---|---|---|---|
| name data | number of characters of name | 1 | binary | 0–15 |
| | name | 30 | Korean industrial standard | |
| | name designating coordinate point | X coordinate | 4 | binary | 0–4294967295 (meter) |
| | | Y coordinate | 4 | binary | |

The following Table 9 shows the format of administrative district data.

TABLE 9

| item | | | data length | form | range |
|---|---|---|---|---|---|
| admini- strative district data | kind of administrative district | | 9 | ASCII character | classification of administrative district of the Bureau of Statistics |
| shape coordinate group | total number (M) of shape coordinates | | 2 | binary | 1–65536 |
| | shape coordinate point (1) | X coordinate | 4 | binary | 0–4294967295 (meter) |
| | | Y coordinate | 4 | binary | |
| | ... | | | | |
| | shape coordinate point (M) | X coordinate | 4 | binary | 0–4294967295 (meter) |
| | | Y coordinate | 4 | binary | |
| name data | number of characters of name | | 1 | binary | 0–15 |
| | name | | 30 | Korean industrial standard | |
| | name designating coordinate point | X coordinate | 4 | binary | 0–4294967295 (meter) |
| | | Y coordinate | 4 | binary | |

The following Table 10 shows the resolution of the display unit 40 and the size of one character of the name of each level. The font used is 8×8. If the font of 16×16 is used, each value is doubled. If the resolution of the display unit 40 is 1024×768, the X and Y directions for one character of the name of the level are 34.4 and 58.4 in length. Table 10 is previously stored in the map data memory 20.

TABLE 10

| resolution of display unit | direction | size of one character of name of each level (meter) | | | | | | calculation (size of one pixel of level 1) |
|---|---|---|---|---|---|---|---|---|
| | | 1 | 2 | 3 | 4 | 5 | 6 | |
| 1024 × 768 | X | 17.2 | 86 | 172 | 344 | 688 | 1376 | 2200 ÷ 1024 ≈ 2.15(m) |
| | Y | 29.2 | 146 | 292 | 584 | 1168 | 3504 | 2800 ÷ 768 ≈ 3.65(m) |
| 800 × 600 | X | 22 | 110 | 220 | 440 | 880 | 1760 | 2200 ÷ 800 ≈ 2.75(m) |
| | Y | 37.4 | 187 | 374 | 748 | 1496 | 4488 | 2800 ÷ 600 ≈ 4.67(m) |
| 640 × 480 | X | 27.5 | 137.5 | 275 | 5So | 1100 | 2200 | 2200 ÷ 640 ≈ 3.44(m) |
| | Y | 46.6 | 233 | 466 | 932 | 1864 | 5592 | 2800 ÷ 480 ≈ 5.83(m) |
| 20 × 234 | X | 55 | 275 | 550 | 1100 | 2200 | 4400 | 2200 ÷ 320 ≈ 6.88(m) |

TABLE 10-continued

| resolution of display unit | direction | size of one character of name of each level (meter) | | | | | | calculation (size of one pixel of level 1) |
|---|---|---|---|---|---|---|---|---|
| | | 1 | 2 | 3 | 4 | 5 | 6 | |
| | Y | 95.8 | 479 | 958 | 1916 | 3832 | 11496 | 2800 ÷ 234 ≈ 11.97(m) |
| 240 × 240 | X | 73.4 | 367 | 734 | 1468 | 2936 | 5872 | 2200 ÷ 240 ≈ 9.17(m) |
| | Y | 93.4 | 467 | 934 | 1868 | 3736 | 11208 | 2800 ÷ 240 ≈ 11.67(m) |
| 200 × 200 | X | 88 | 440 | 880 | 1760 | 3520 | 7040 | 2200 ÷ 200 ≈ 11(m) |
| | Y | 112 | 560 | 1120 | 2240 | 4480 | 13440 | 2800 ÷ 200 ≈ 14(m) |

Figure 3:
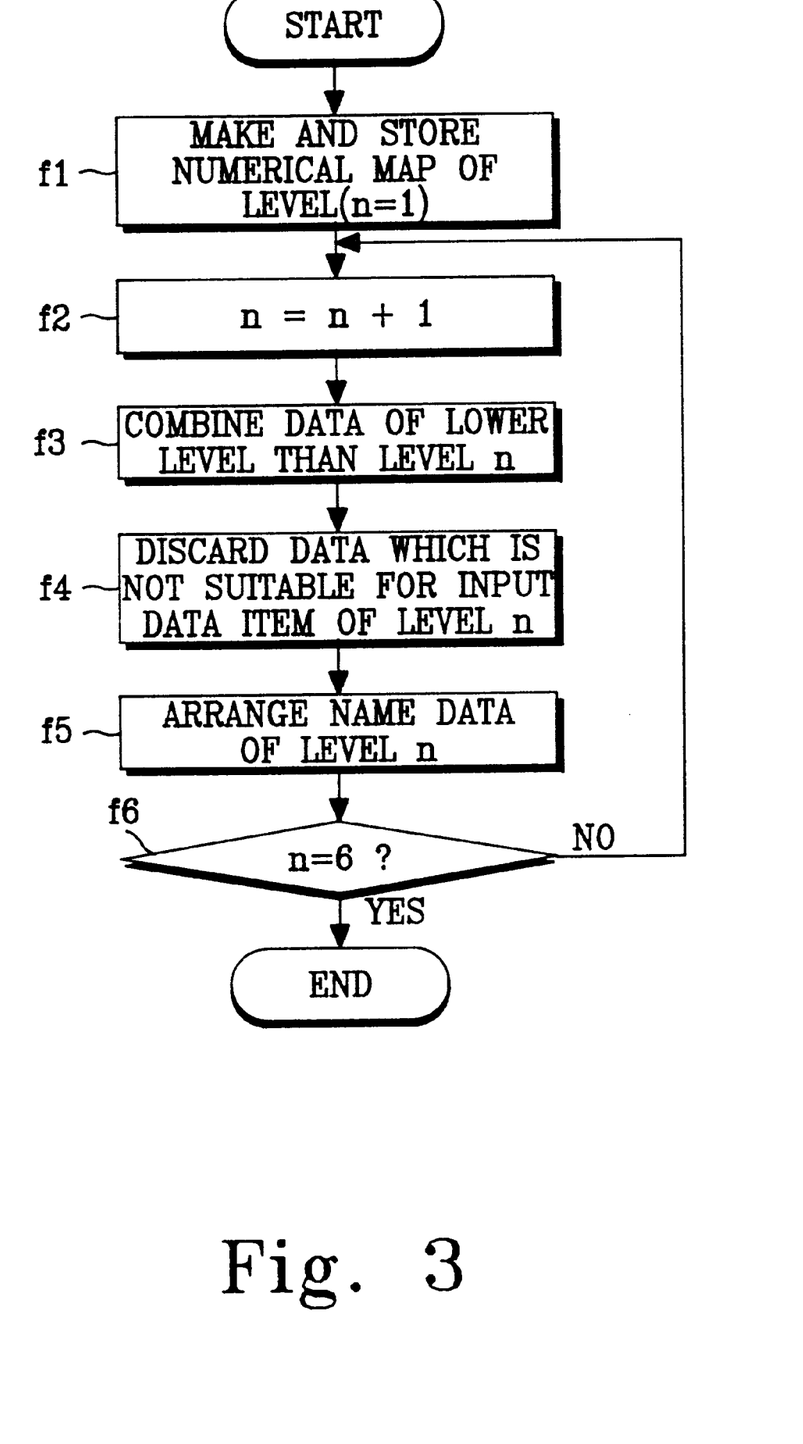
FIG. 3 is a flow chart illustrating a numerical map shape data converting process according to one preferred embodiment of the present invention.

FIG. 3 shows a numerical map shape data converting process. At step f1, the numerical map of the lowest level, that is, of the level 1 is made and stored. The numerical map is made through an aerial survey, satellite photographing, actual survey, etc. At step f2, the parameter n is increased by 1. At step f3, 25 data of a lower level than the level 2 is combined. That is, the level 2 is formed by adding 25 data of the lowest level. At step f4, data which is not suitable for an input data item of the level 2 is discarded. At step f5, name data of the level 2 is arranged through a process shown in FIGS. 4A and 4B. At step f6, whether the parameter n is 6 is checked. If the parameter n is not 6, the next level is formed. The number of the combined data varies according to each level. In the levels 3, 4, 5 and 6, 100, 400, 1600 and 9600 data are respectively combined.

Figure 4A:
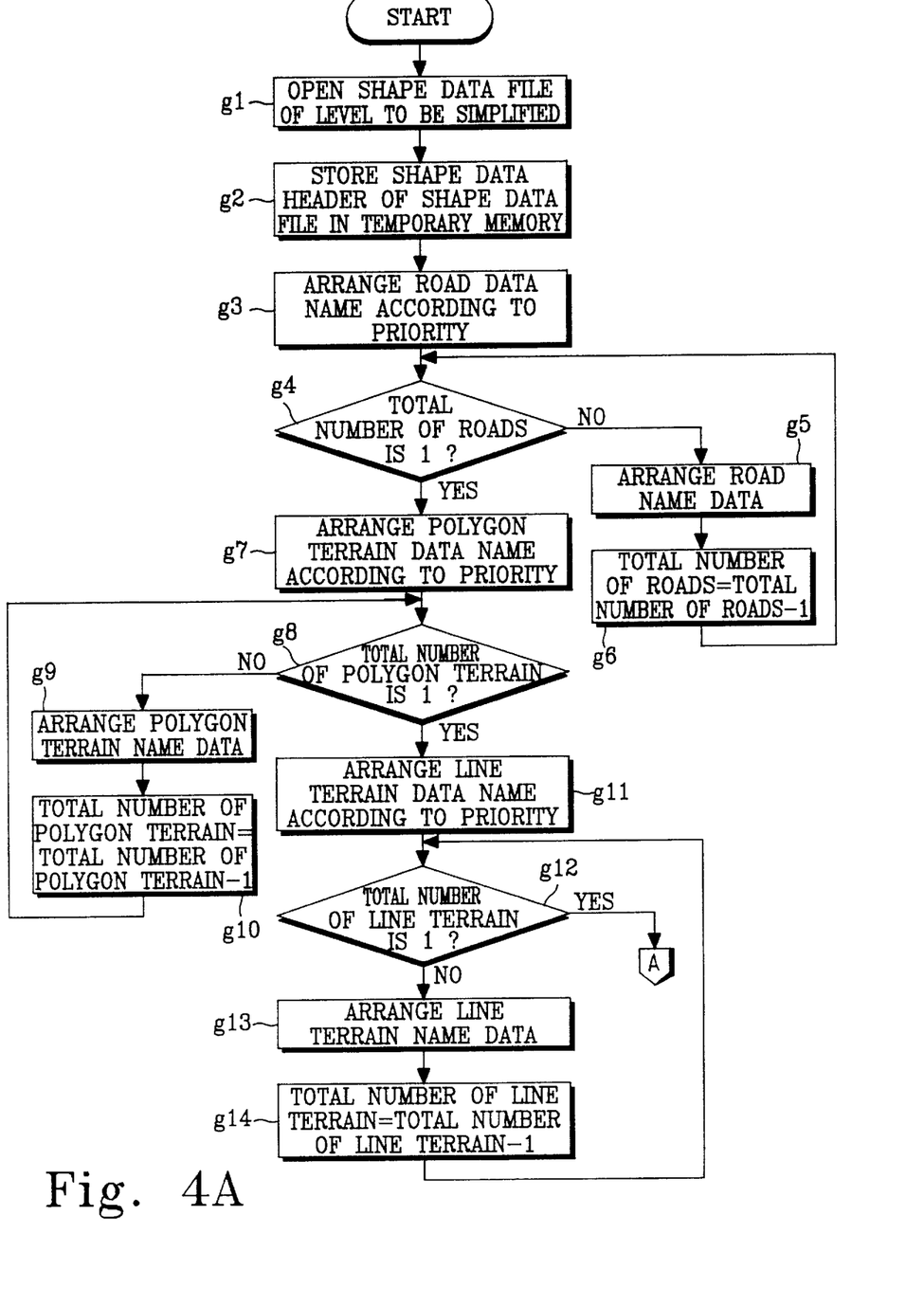
FIGS. 4A and 4B are flow charts illustrating name data arranging processes of each shape data of any level in FIG. 3.
Figure 4B:
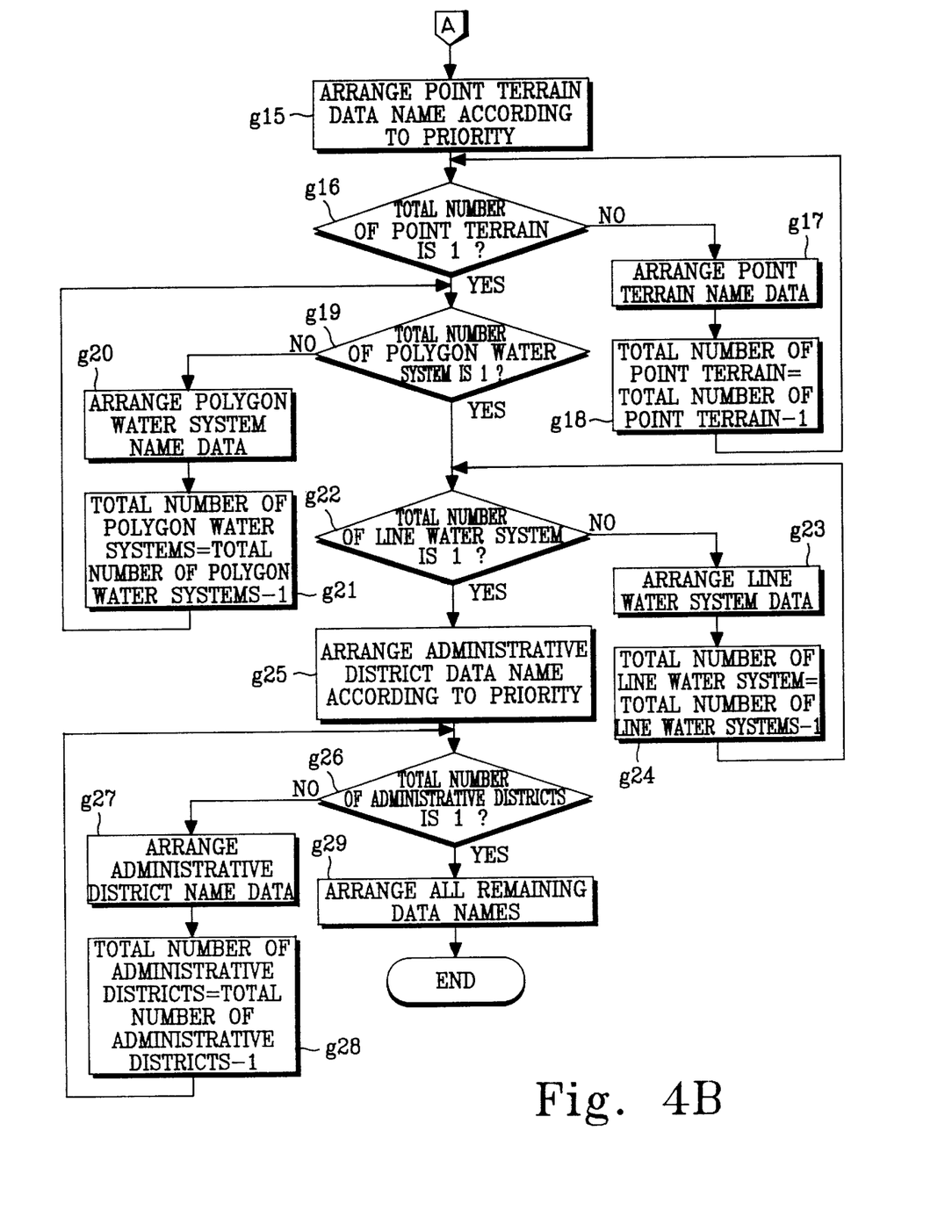

FIGS. 4A and 4B show a name data adjusting process of each shape data of any level in FIG. 3. At step g1, the operation processor 10 opens a shape data file of the level to be simplified. At step g2, a shape data header of the shape data file is stored in the temporary memory 60. At step g3, the operation processor 10 arranges a road data name according to priority. At step g4, whether the total number of roads is 1 is checked. If it is not 1, road name data is arranged at step g5 through a process shown in FIG. 5. At step g6, the total number of roads is decreased by 1. Step g6 is followed by step g4.

If the total number of roads is 1, a polygon terrain data name is arranged according to priority at step g7. At step g8, whether the total number of polygon terrain is 1 is checked. If it is not 1, polygon terrain name data is arranged at step g9 through the process shown in FIG. 5. At step g10, the total number of polygon terrain is decreased by 1 to update the total number of polygon terrain. Step g10 is followed by step g8.

If the total number of polygon terrain is 1 at step g8, a line terrain data name is arranged according to priority at step g11. At step g12, whether the total number of line terrain is 1 is checked. If it is not 1, line terrain name data is arranged at step g13 through the process shown in FIG. 5. At step g14, the total number of line terrain is decreased by 1. Step g14 is followed by step g12.

Meanwhile, if the total number of line terrain is 1 at step g12, a point terrain data name is arranged according to priority at step g15. At step g16, whether the total number of point terrain is 1 is checked. If it is not 1, point terrain name data is arranged at step g17 through the process shown in FIG. 5. At step g18, the total number of point terrain is decreased by 1 to update the total number of polygon terrain. Step g18 proceeds to step g16.

If the total number of point terrain is 1 at step g16, whether the total number of polygon water systems is 1 is checked at step 19. If it is not 1, polygon water system name data is arranged at step g20 through the process shown in FIG. 5. At step g21, the total number of polygon water systems is decreased by 1. Step g21 is followed by step g19.

If the total number of polygon water systems is 1 at step g19, whether the total number of line water systems is 1 is checked at step 22. If it is not 1, line water system name data is arranged at step g23 through the process shown in FIG. 5. At step g24, the total number of line water systems is decreased by 1. Step g24 is followed by step g22.

If the total number of line water systems is 1 at step 22, an administrative district data name is arranged according to priority at step 25. At step 26, whether the total number of administrative districts is 1 is checked. If it is not 1, administrative district name data is arranged at step g27 through the process shown in FIG. 5. At step g28, the total number of administrative districts is decreased by 1. Step g28 is followed by step 26.

The above steps arrange each data according to priority. If the total number of administrative districts is 1 at step g26, the operation processor 10 judges that a task for each data has been completed. At step g29, the remaining data names are arranged according to priority.

Figure 5:
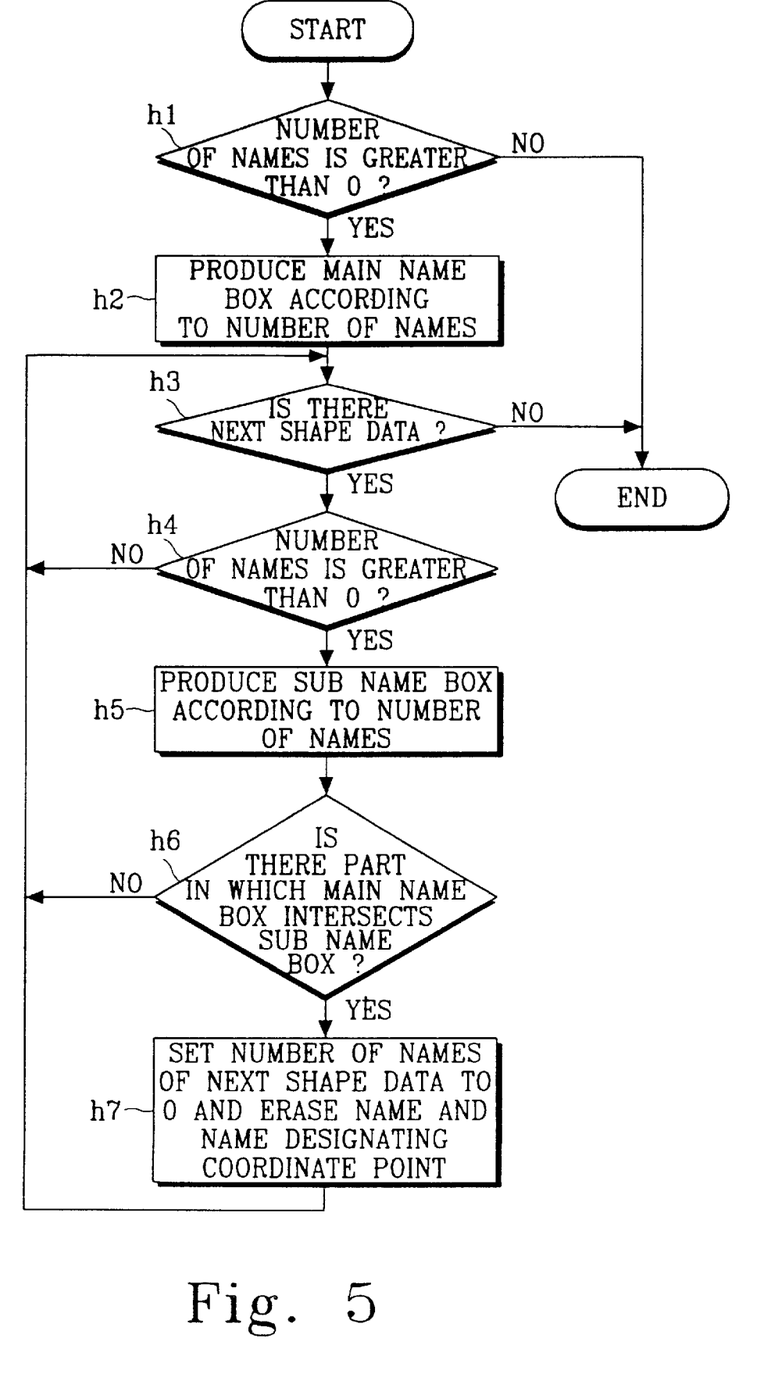
FIG. 5 is a flow chart illustrating a name data processing process in FIGS. 4A and 4B.

FIG. 5 illustrates a name data processing process. At step h1, the operation processor 10 checks whether the number of characters of the name (hereinafter referred to as the number of names) is greater than 0 by accessing a shape data (for example, road data) region of the map data memory 20. If it is less than 0, the operation processor 10 judges that corresponding shape data does not have the name and terminates a task. If the number of names is greater than 0, a main name box is produced according to the number of names at step h2. At step h3, whether there is next shape data is checked. If there is next shape data, whether the number of names is greater than 0 is checked at step h4. If it is greater than 0, a sub name box is produced according to the number of names at step h5. At step h6, whether 4 lines connecting 4 apexes of the main name box intersect 4 lines connecting 4 apexes of the sub name box is checked. If they are intersected, the number of names of the next shape data is set to 0, and the name and a name designating coordinate point are erased at step h7.

Consequently, assuming that 10 names correspond to the shape data having sequential priority in the order of 'HANKANG', '63 BUILDING', 'YOEIDO', . . . , 'DAERIM', the main name box is set to the name 'HANKANG' having the highest priority. While the sub name box is sequentially set to the other names '63 BUILDING', 'YOEIDO',. . . , 'DAERIM', the name which should be erased, that is, the name overlapped with 'HANKANG' is determined. If the name '63 BUILDING' is erased through such processes, the main name box is set to 'YOEIDO'. While the sub name box is sequentially set to the other names, the name which should be erased is determined.

As noted above, when making the numerical map drawn on a large reduced scale by using the numerical map drawn on a small reduced scale, accurate standards are used in processing the roads with the name and the terrain data and it is possible to automate the data. Therefore, a name processing method is efficient and the names are displayed without being repeated during combining.

It should be understood that the present invention is not limited to the particular embodiment disclosed herein as the best mode contemplated for carrying out the present invention, and that the present invention is not limited to the specific embodiments described in this specification except as defined in the appended claims.

What is claimed is:

1. A method for processing a name when converting a numerical map of a low level into a numerical map of a high level in a geographic information system which has a map data memory and displays a numerical map of any reduced scale by shape data, said map data memory storing shape data, including at least one of road data, polygon terrain data, line terrain data, point terrain data, polygon water system data, line water system data, administrative district data, and storing a shape data header, map reduced scale level information, resolution of a display unit and a size of one character of a name of each level according to a font, said method comprising the steps of:

opening a shape data file of said low level;

reading said shape data header from said shape data file of said low level;

arranging each data contained in the numerical map of said low level according to priority on the basis of the contents of said shape data header, sequentially determining a main name which is a criterion of comparison and a sub name which is an object of comparison, generating a main name box and a sub name box according to a position and an area in which said main name and said sub name are displayed on the numerical map of said high level, checking whether a part or all parts of said sub name box is overlapped with said main name box, and erasing a corresponding name and a name designating coordinate point when there is an overlapped part; and arranging all remaining data which is not erased according to priority, sequentially determining a main name which is a criterion of comparison and a sub name which is an object of comparison, generating a main name box and a sub name box according to a position and an area in which said main name and said sub name are displayed on the numerical map of said high level, checking whether a section or all sections of said sub name box is overlapped with said main name box, and erasing a name corresponding to the sub name and a name designating coordinate point corresponding to the sub name when there is an overlapped section.

2. A method for processing text when converting a numerical map of a low level into a numerical map of a high level in a geographic information system, said method comprising the steps of:

(a) establishing a respective priority for each named item in the numerical map;

(b) establishing respective boxes surrounding a name of each of said named items according to a position and an area in which each of said named items are displayed on the numerical map of said high level;

(c) determining whether the box associated with the name of the named item having highest priority overlaps a box associated with the name of a named item having lower priority;

(d) eliminating the name of the named item having lower priority when an overlap is determined in said step (c), otherwise retaining the name of the named item having lower priority; and (e) sequentially determining the named item of next highest priority as the named item of highest priority and repeating steps (c) through (e) until it is determined whether the box associated with the name of the named item having lowest priority overlaps a box associated with the name of a named item having priority next higher than the lowest priority.

3. The method as claimed in claim 2, wherein in said eliminating step the overlap is determined by checking whether any of four lines connecting four corners of the box associated with the named item having highest priority intersects any of four lines connecting four corners of the box associated with the named item having lower priority.

* * * * *